US 6,683,758 B2

(12) United States Patent
Hipwell, Jr. et al.

(10) Patent No.: US 6,683,758 B2
(45) Date of Patent: Jan. 27, 2004

(54) FABRICATION METHOD FOR INTEGRATED MICROACTUATOR COILS

(75) Inventors: Roger L. Hipwell, Jr., Eden Prairie, MN (US); Wayne A. Bonin, North Oak, MN (US); Lee Walter, Plymouth, MN (US); Barry D. Wissman, Ann Arbor, MN (US); Zine-Eddine Boutaghou, Vadnais Heights, MN (US); Barbara J. Ihlow-Mahrer, Crystal, MN (US); Peter Crane, Bloomington, MN (US); Brian Dufrene, Cottage Grove, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 142 days.

(21) Appl. No.: 09/866,942

(22) Filed: May 29, 2001

(65) Prior Publication Data

US 2001/0048577 A1 Dec. 6, 2001

Related U.S. Application Data

(60) Provisional application No. 60/209,016, filed on Jun. 1, 2000.

(51) Int. Cl.$^7$ ............................................. G11B 5/56
(52) U.S. Cl. ........................................... 360/294.5
(58) Field of Search ................................... 360/294.5

(56) References Cited

U.S. PATENT DOCUMENTS

| | | | |
|---|---|---|---|
| 3,924,268 A | 12/1975 | McIntosh et al. | 360/78 |
| 4,374,402 A | 2/1983 | Blessom et al. | 360/104 |
| 4,651,242 A | 3/1987 | Hirano et al. | 360/103 |
| 4,764,829 A | 8/1988 | Makino | 360/106 |
| 4,914,725 A | 4/1990 | Belser et al. | 318/560 |
| 5,021,906 A | 6/1991 | Chang et al. | 360/103 |
| 5,034,828 A | 7/1991 | Ananth et al. | 360/75 |
| 5,177,652 A | 1/1993 | Yamaguchi et al. | 360/78.05 |
| 5,189,578 A | 2/1993 | Mori et al. | 360/106 |
| 5,303,105 A | 4/1994 | Jorgenson | 360/106 |
| 5,364,742 A | 11/1994 | Fan et al. | 430/317 |
| 5,375,033 A | 12/1994 | MacDonald | 361/281 |
| 5,521,778 A | 5/1996 | Boutaghou et al. | 360/106 |
| 5,657,188 A | 8/1997 | Jurgenson et al. | 360/106 |
| 5,745,319 A | 4/1998 | Takekado et al. | 360/78.05 |
| 5,764,444 A | 6/1998 | Imamura et al. | 360/109 |

(List continued on next page.)

FOREIGN PATENT DOCUMENTS

| | | | |
|---|---|---|---|
| EP | 0 412 221 B1 | 11/1989 | G11B/21/02 |
| JP | 63-122069 | 5/1988 | G11B/21/02 |
| JP | 02-263369 | 4/1989 | G11B/21/10 |
| JP | 04-134681 | 5/1992 | G11B/21/10 |
| JP | 04-368676 | 12/1992 | G11B/21/08 |
| JP | 05-094682 | 4/1993 | G11B/21/21 |
| JP | 06-020412 | 1/1994 | G11B/21/10 |
| JP | 07-085621 | 3/1995 | G11B/21/20 |

OTHER PUBLICATIONS

"Silicon Micromachined Electromagnetic Microactuators for Rigid Disk Drives" by Tang et al, *IEEE Transactions on Magnetics*, vol. 31, No. 6, Nov. 1995.

"Magnetic Recording Head Positioning at Very High Track Densities Using a Microactuator–Based, Two–Stage Servo System" by Fan et al., *IEEE Transactions on Industrial Electronics*, vol. 42, No. 3, Jun. 1995.

(List continued on next page.)

*Primary Examiner*—Robert S. Tupper
(74) *Attorney, Agent, or Firm*—Kinney & Lange, P.A.

(57) ABSTRACT

A method for fabricating an integrated coil-on-keeper assembly for use in a magnetic circuit to actuate a microactuator. The assembly is formed on a keeper substrate by patterning an insulator layer, plating at least one coil layer and patterning another insulator layer on top of each coil layer. The keeper substrate is etched to form the top keeper of the coil-on-keeper assembly.

18 Claims, 11 Drawing Sheets

U.S. PATENT DOCUMENTS

| | | | |
|---|---|---|---|
| 5,781,381 A | 7/1998 | Koganezawa et al. | 360/106 |
| 5,796,558 A | 8/1998 | Hanrahan et al. | 360/106 |
| 5,801,472 A | 9/1998 | Wada et al. | 310/309 |
| 5,805,375 A | 9/1998 | Fan et al. | 360/78.12 |
| 5,856,896 A | 1/1999 | Berg et al. | 360/104 |
| 5,863,024 A | 1/1999 | Blind et al. | 251/129.01 |
| 5,867,347 A | 2/1999 | Knight et al. | 360/104 |
| 5,896,246 A | 4/1999 | Budde et al. | 360/104 |
| 5,898,541 A | 4/1999 | Boutaghou et al. | 360/109 |
| 5,898,544 A | 4/1999 | Krinke et al. | 360/104 |
| 5,920,441 A | 7/1999 | Cunningham et al. | 360/78.05 |
| 5,936,805 A | 8/1999 | Imaino | 360/104 |
| 5,959,808 A | 9/1999 | Fan et al. | 360/106 |
| 6,043,957 A | 3/2000 | Hattori et al. | 360/106 |
| 6,064,550 A | 5/2000 | Koganezawa | 360/106 |
| 6,414,823 B1 | 7/2002 | Crane et al. | 360/294.5 |
| 6,501,623 B1 * | 12/2002 | Sassolini et al. | 360/245.3 |

OTHER PUBLICATIONS

"A Flexural Piggyback Milli–Actuator for Over 5 Gbit/in$^2$ Density Magnetic Recording" by Koganezawa et al, *IEEE Transactions on Magnetics*, vol. 32, No. 5, Sep. 1996.

"Transverse Mode Electrostatic Microactuator for MEMS – Based HDD Slider" by Imamura et al, *IEEE* 1996.

"An Experiment for Head Positioning System Using Sub–micron Track–width GMR Head" by Yoshikawa et al., *IEEE Transactions on Magnetics*, vol. 32, No. 5, Sep. 1996.

"Micro Electrostatic Actuators in Dual–Stage Disk Drives with High Track Density" by Tang et al., *IEEE Transactions on Magnetics*, vol. 32, No. 5, Sep. 1996.

"Piezoelectric Microactuator Compensating for Off–Track Errors in Magnetic Disk Drives" by Imamura et al, *Advance Information Storage Systems*, vol. 5, pp 119–126.

"A Dual–Stage Magnetic Disk Drive Actuator Using a Piezoelectric Device for a High Track Density" by Mori et al., *IEEE Transactions on Magnetics*, vol. 27, No. 6, Nov. 1991.

"Dynamic Loading Criteria for 3–1/2 Inch Inline HDD Using Multilayer Piezoelectric Load/Unload Mechanism" by Kajitani et al., *IEEE Transactions on Magnetics*, vol. 27, No. 6, Nov. 1991.

"Design, Fabrication, and Testing of Silicon Microgimbals for Super–Compact Rigid Disk Drives" by Temesvary et al., *Journal of Microelectromechanical Systems*, vol. 4, No. 1, Mar. 1995.

* cited by examiner

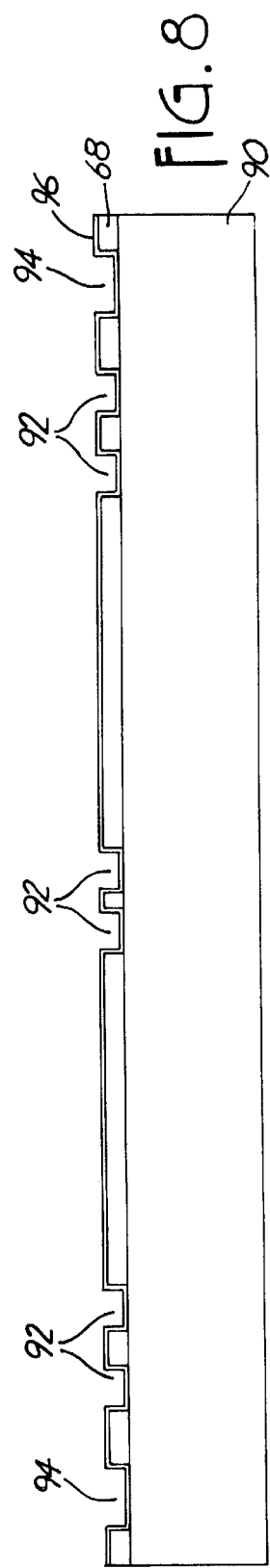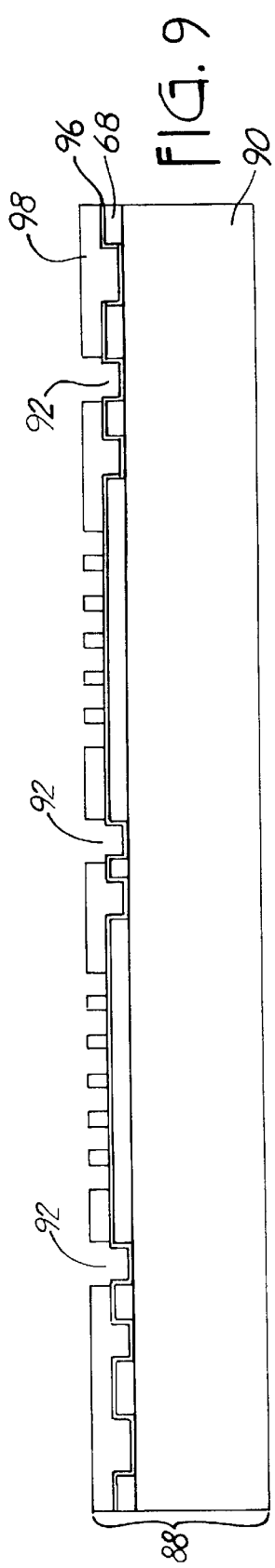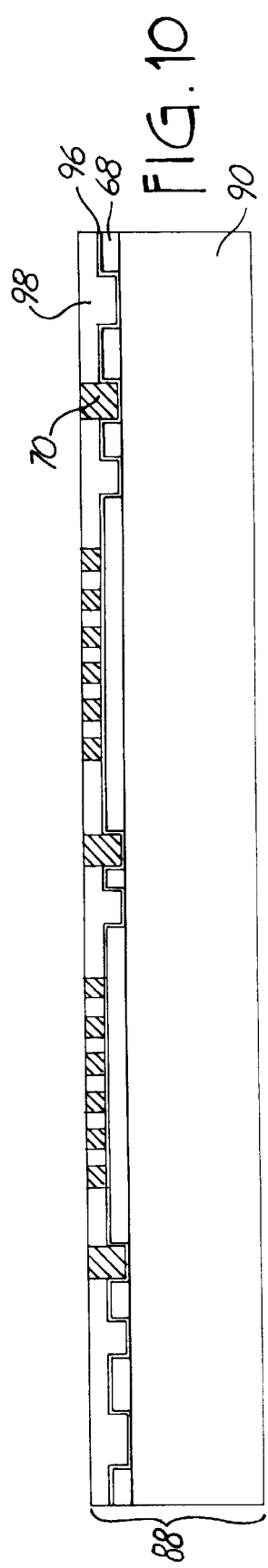

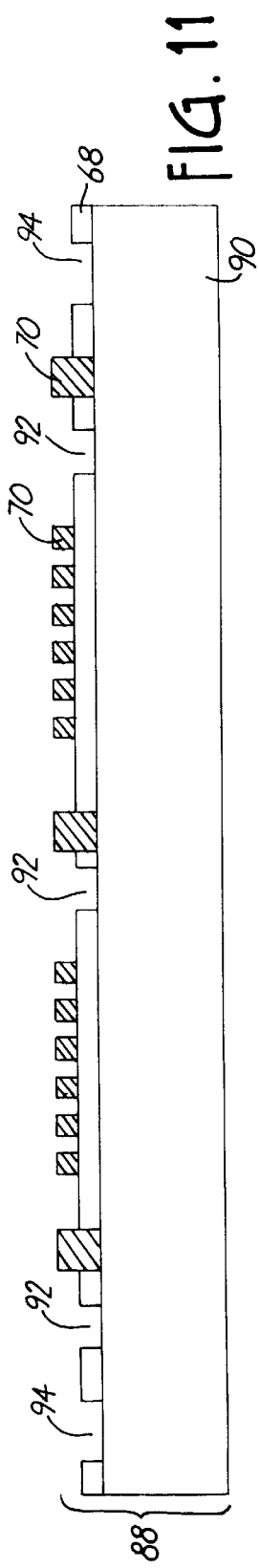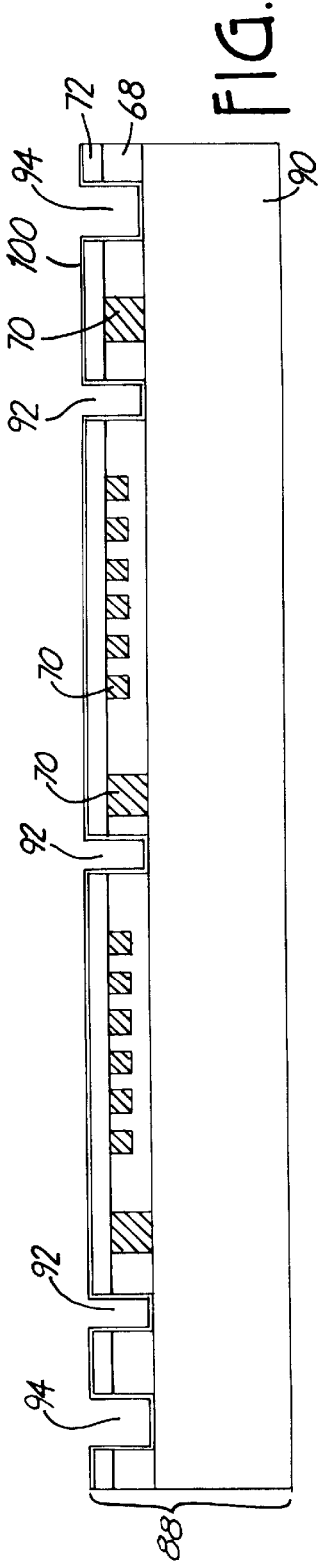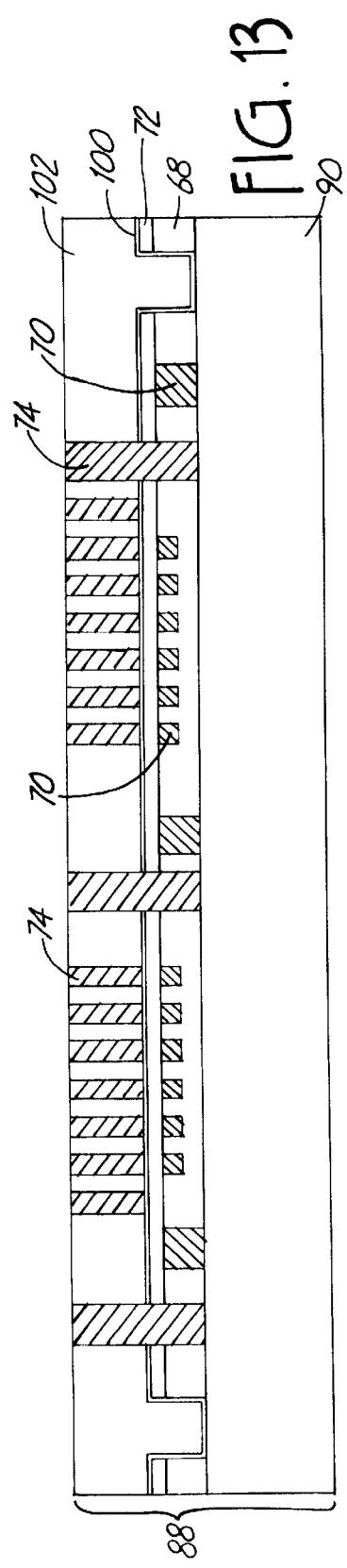

FABRICATION METHOD FOR INTEGRATED MICROACTUATOR COILS

CROSS-REFERENCE TO RELATED APPLICATION(S)

This application claims priority from Provisional Application No. 60/209,016, filed Jun. 1, 2000 for "Fabrication Method for Integrated Microactuator Coils" by Roger L. Hipwell, Jr., Wayne A. Bonin, Lee Walter, Barry D. Wissman, Zine-Eddine Boutaghou, Barbara J. Ihlow-Mahrer, Peter Crane, and Brian Dufrene.

BACKGROUND OF THE INVENTION

The present invention relates to a method for fabricating an integrated coil-on-keeper assembly.

The density of concentric data tracks on magnetic discs continues to increase (that is, the width of data tracks and radial spacing between data tracks are decreasing), requiring more precise radial positioning of the head. Conventionally, head positioning is accomplished by operating an actuator arm with a large-scale actuation motor, such as a voice coil motor, to radially position a slider (which carries the head) on a flexure at the end of the actuator arm. The large-scale motor lacks sufficient resolution to effectively accommodate high track-density discs. Thus, a high resolution head positioning mechanism, or microactuator, is necessary to accommodate the more densely spaced tracks.

One particular design for high resolution head positioning involves employing a high resolution microactuator in addition to the conventional lower resolution actuator motor, thereby effecting head positioning through dual stage actuation. Various microactuator designs have been considered to accomplish high resolution head positioning. In particular, magnetic microactuator designs featuring a magnet/keeper assembly and coil have been developed. Magnetic microactuators typically include a stator portion and a rotor portion, the stator being attached to the flexure and the rotor supporting the slider. The rotor is movable with respect to the stator such that the slider can be positioned more precisely over a track of a disc.

The components that make up a magnetic microactuator can be numerous. Typically, such components include a micromachined stator/rotor element, a conductive drive coil, a conductive sense coil, a permanent magnet, a keeper layer to contain the magnetic field and insulator layers. The cost of manufacturing and assembling these separate components into a single microactuator can be prohibitive. Furthermore, establishing a fully integrated process with all these components is not actively feasible due to process limitations, the geometry of the device, contamination concerns or chemical incompatibility. An assembly for use in a magnetic microactuator with coil and keeper components can be found in U.S. patent application Ser. No. 09/490,421, filed Jan. 24, 2000, by Crane et al., entitled "Coil Structures for Magnetic Microactuator" and is hereby incorporated by reference. Some components of the microactuator can be integrated into an assembly in a single process and are the subject of the present invention. There is a need in the art for a method of fabricating an integrated assembly comprised of the keeper, the coils and the insulator components of the microactuator, particularly a fabrication method that is cost efficient and produces the assemblies in bulk.

BRIEF SUMMARY OF THE INVENTION

The present invention is a method for fabricating an integrated coil-on-keeper assembly for use with a magnetic circuit in a microactuator. The method includes forming a keeper substrate and forming a top insulator layer upon the keeper substrate. A coil layer is formed on top of the top insulator layer and the keeper substrate. A bottom insulator layer is formed upon the coil layer and the keeper substrate is etched to form a top keeper. A plurality of coil-on-keeper assemblies are formed in one process on a single keeper substrate and then singulated after etching the top keeper. During fabrication a singulation via is formed around each coil-on-keeper assembly formed on the keeper substrate. A temporary support is formed within each singulation via and around each individual coil-on-keeper assembly prior to etching the top keeper. The temporary support holds each assembly on the keeper substrate during etching of the top keeper.

Coil-on-keeper assemblies are also fabricated with a drive coil layer and a sense coil layer. A middle insulator layer is formed between the two coil layers to encapsulate each coil layer. In each coil-on-keeper assembly, portions of each coil layer are exposed through electrical vias in the top insulator layer. Solder pads can be connected at these points where the coil layers are exposed to provide electrical contacts with the coils.

BRIEF DESCRIPTION OF THE DRAWINGS

FIGS. 8–17 are sectional views of the coil-on-keeper assembly taken along line A—A of FIG. 3 illustrating various stages of the process flow.

DETAILED DESCRIPTION

Figure 1:
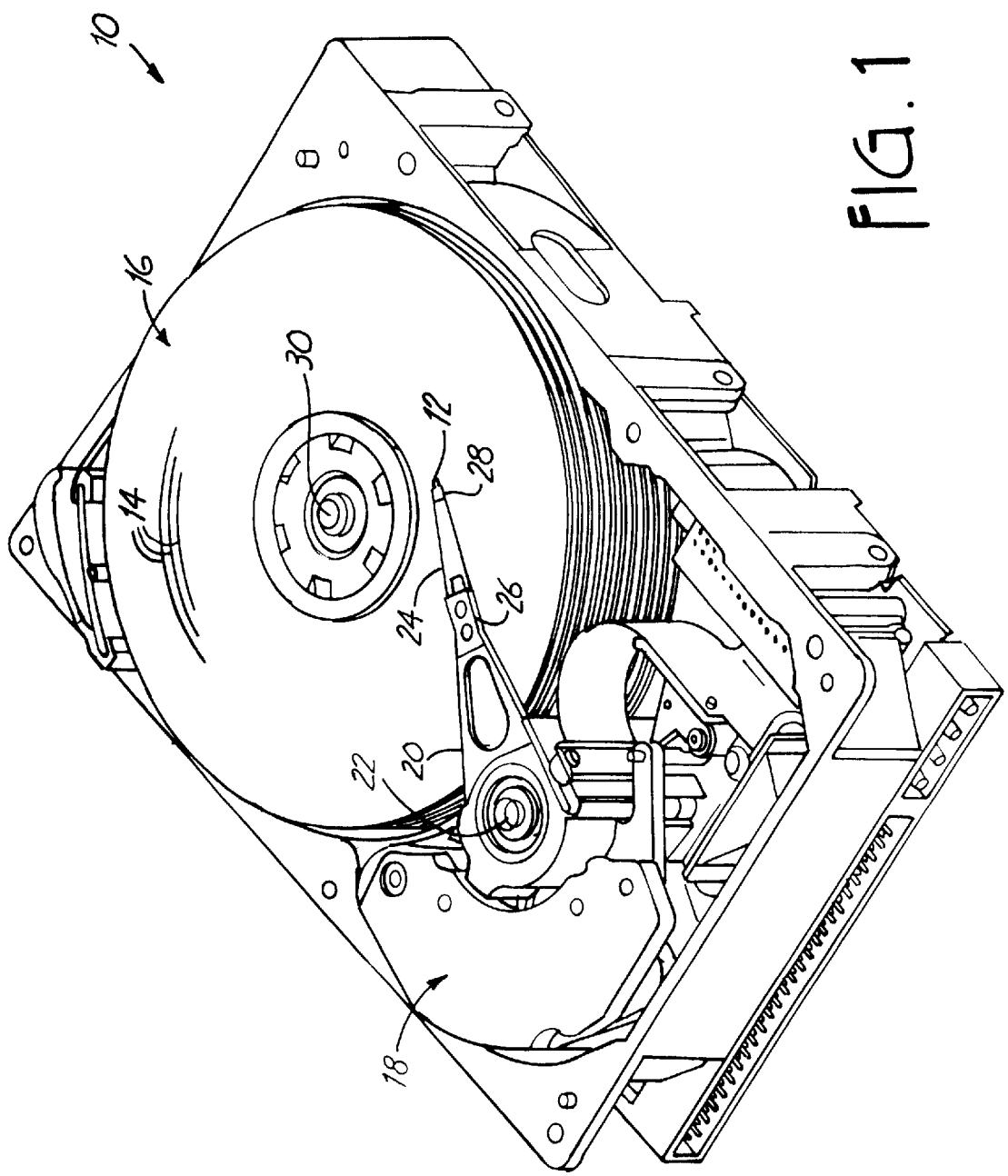
FIG. 1 is a perspective view of a conventional disc drive actuation system for positioning a slider over a track of a disc.

FIG. 1 is a perspective view of disc drive actuation system 10 for positioning slider 12 over track 14 of disc 16. Actuation system 10 includes voice coil motor (VCM) 18 arranged to rotate actuator arm 20 on a spindle around axis 22. Head suspension 24 is connected to actuator arm 20 at head mounting block 26. Flexure 28 is connected to an end of head suspension 24, and carries slider 12. Slider 12 carries a transducing head (not shown in FIG. 1) for reading and/or writing data on concentric tracks 14 of disc drive 16. Disc 16 rotates around axis 30, so that windage is encountered by slider 12 to keep it aloft a small distance above the surface of disc 16.

VCM 18 is selectively operated to move actuator arm 20 about axis 22, thereby moving slider 12 between tracks 14 of disc 16. However, for disc drive systems with high track density, VCM 18 lacks significant resolution and frequency response to position a transducing head on slider 12 precisely over a selected track 14 of disc 16. Therefore, a high resolution actuation device is necessary.

Figure 2:
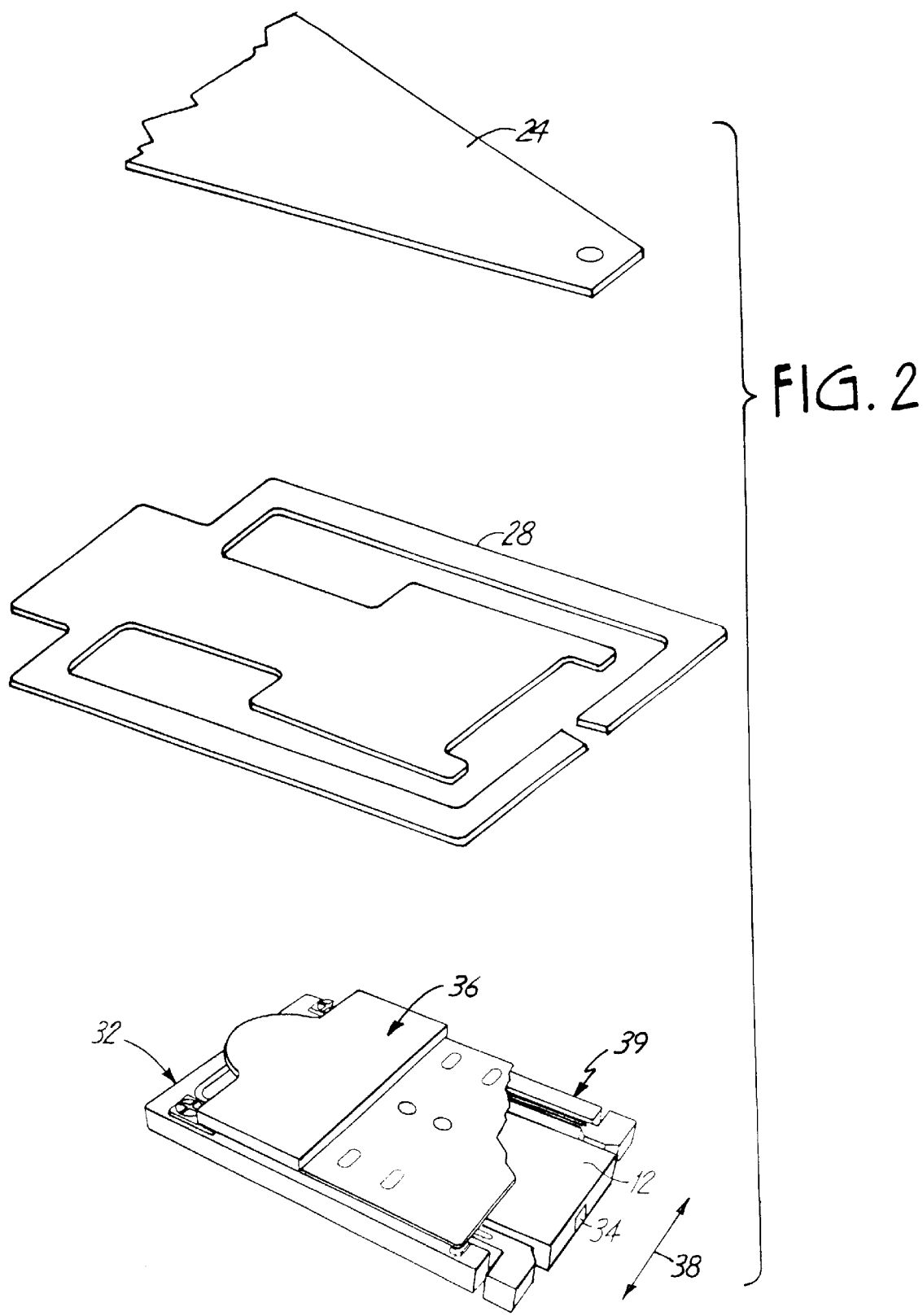
FIG. 2 is an exploded perspective view of a portion of a disc drive including a microactuator and a coil-on-keeper assembly of the present invention.

FIG. 2 is an exploded perspective view of a portion of the disc drive including microactuator 32 for high resolution head positioning. Flexure 28 is attached to head suspension 24 and microactuator 32 is attached to flexure 28. Microactuator 32 carries slider 12 above a surface of disc 16. Transducing head 34 is carried by slider 12 to write and read data to and from the disc. In operation, head suspension 24, flexure 28, and microactuator 32 carrying slider 12 are all moved together as coarse positioning is performed by VCM 18 (FIG. 1) to move actuator arm 20 (FIG. 1). To achieve fine positioning of transducing head 34, microactuator 32 generates a force from a magnetic circuit created with coil-on-keeper assembly 36 which causes bending of beam springs located on the microactuator. As a result, the portion of microactuator 32 carrying slider 12 moves slightly with respect to flexure 28 in the direction of arrows 38, displacing transducing head 34 with high resolution for precise positioning of transducing head 34 over a selected track of the disc.

Figure 3:
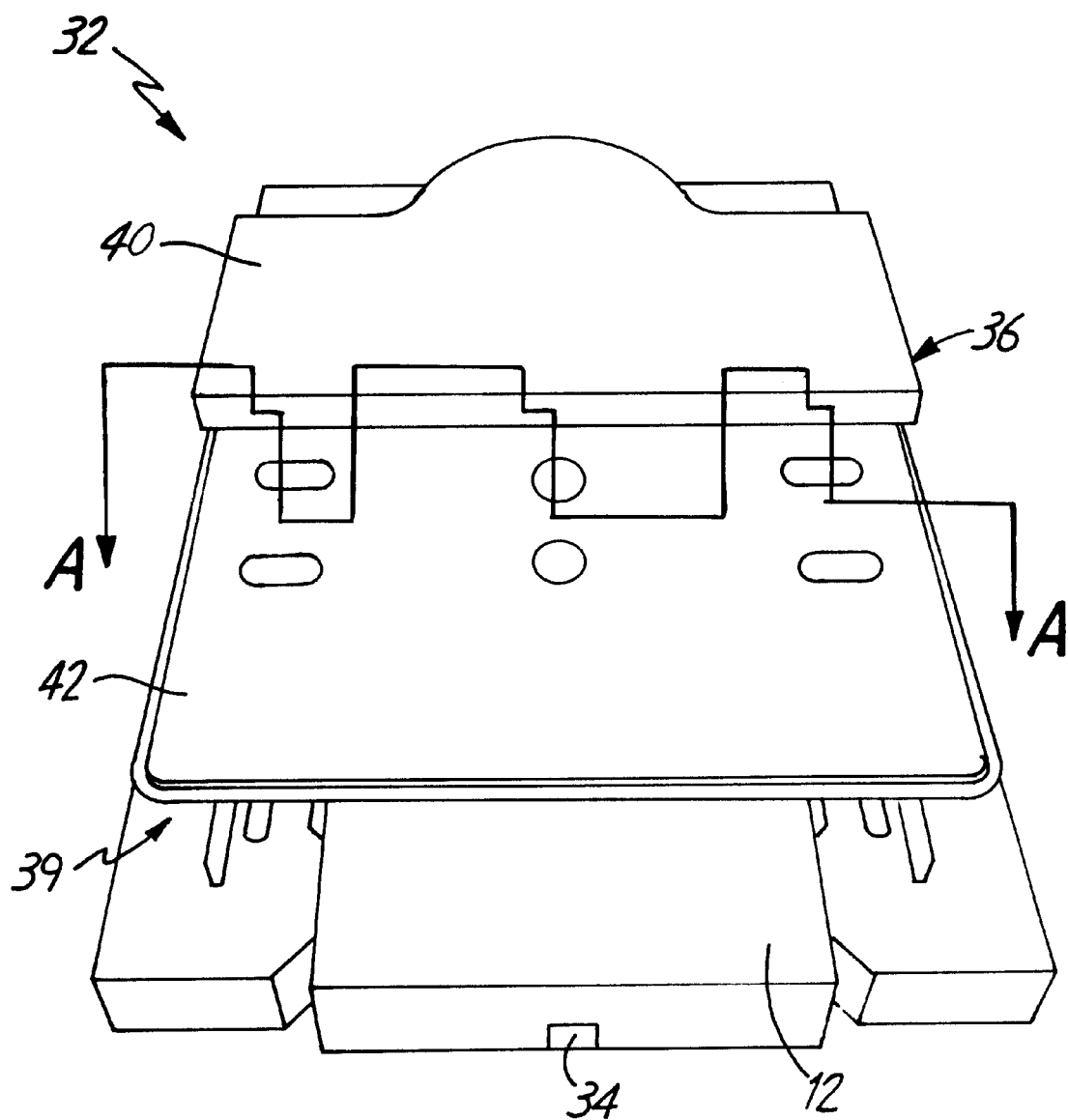
FIG. 3 is a perspective view of the microactuator and the coil-on-keeper assembly.

FIG. 3 shows a top perspective view of microactuator 32. Microactuator 32 is comprised of a microactuator frame 39 with coil-on-keeper assembly 36 bonded to the top of microactuator frame 39. Coil-on-keeper assembly 36 has a top keeper 40 and a coil assembly 42 formed into an integrated device. Coil-on-keeper assembly 36 is bonded to microactuator frame 39 such that coil-on-keeper assembly 36 forms a magnetic circuit with microactuator frame 39.

Figure 4:
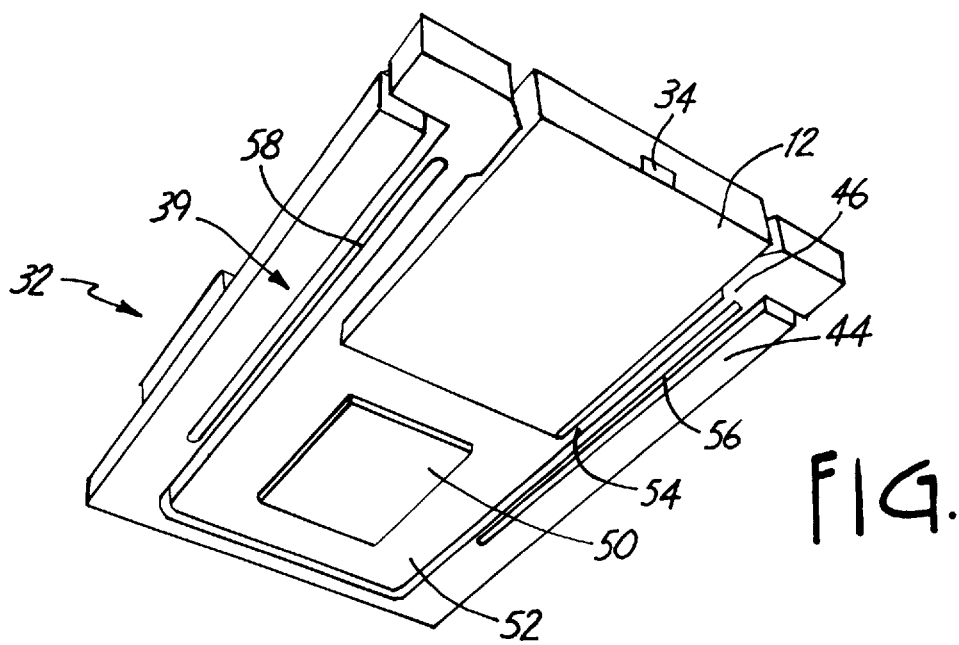
FIG. 4 is a bottom perspective view of the microactuator.

FIG. 4 shows a bottom perspective view of microactuator 32, and more particularly microactuator frame 39. Microactuator frame 39 comprises a stator 44, a rotor 46, one or more magnets (not shown in FIG. 4) and a bottom keeper 50. Rotor 46 is comprised of a magnet bonding pad 52, holding the magnet and bottom keeper 50, and slider bonding pad 54 carrying slider 12 which carries transducing head 34. Flexible beam springs 56 and 58 operatively connect rotor 46 to stator 44 and allow rotor 46 to move with respect to stator 44 during actuation of microactuator 32.

Figure 5:
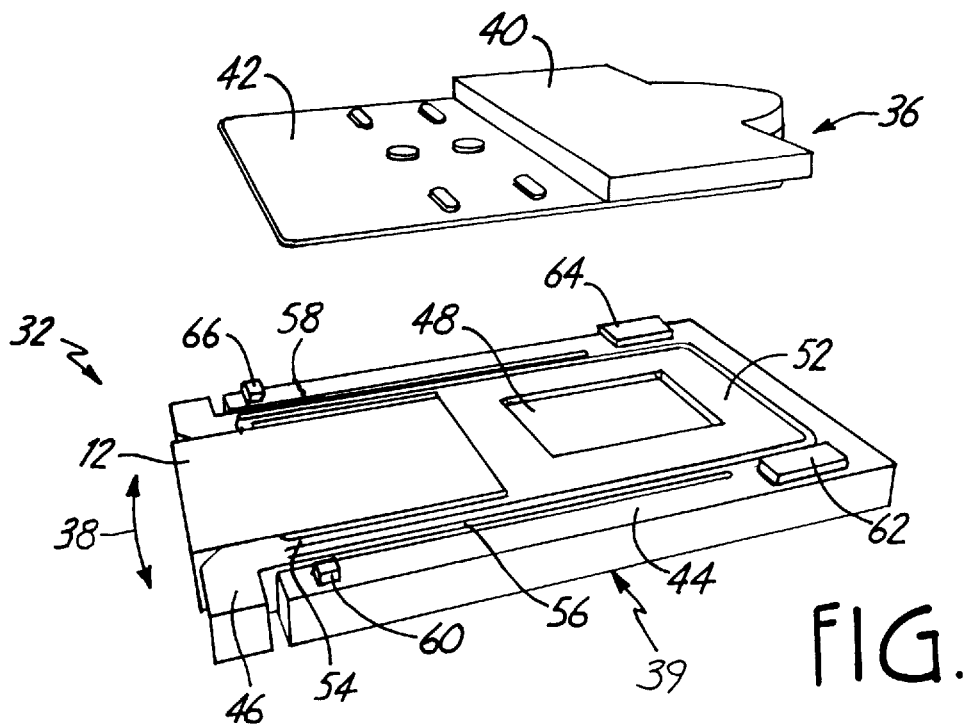
FIG. 5 is an exploded perspective view of the microactuator and coil-on-keeper assembly.

FIG. 5 shows an exploded perspective view of microactuator 32 prior to bonding coil-on-keeper assembly 36 to the top of microactuator frame 39. Stand-offs 60, 62, 64, and 66 are located on the top of stator 44 and provide a location to bond coil-on-keeper assembly 36 to microactuator frame 39. Coil-on-keeper assembly 36 is attached to microactuator frame 39 such that a magnetic circuit is formed between the drive coil of coil-on-keeper assembly 36 and a magnet 48 held in magnet bonding pad 52. Microactuator 32 is actuated by circulating a current through the drive coil in the integrated coil-on-keeper assembly 36. The details of the magnetic circuit are further disclosed in U.S. patent application Ser. No. 09/490,421, filed Jan. 24, 2000, by Crane et al., entitled "Coil Structures for Magnetic Microactuator", which was previously incorporated by reference. In operation, microactuator 32 linearly moves rotor 46 in the direction of arrows 38. The movement of rotor 46, and thereby slider bonding pad 54, finely positions slider 12 over a track of the disc. Although the microactuator of the present invention linearly moves the rotor, those skilled in the art will recognized that other microactuators may be utilized that radially move the rotor.

Figure 6:
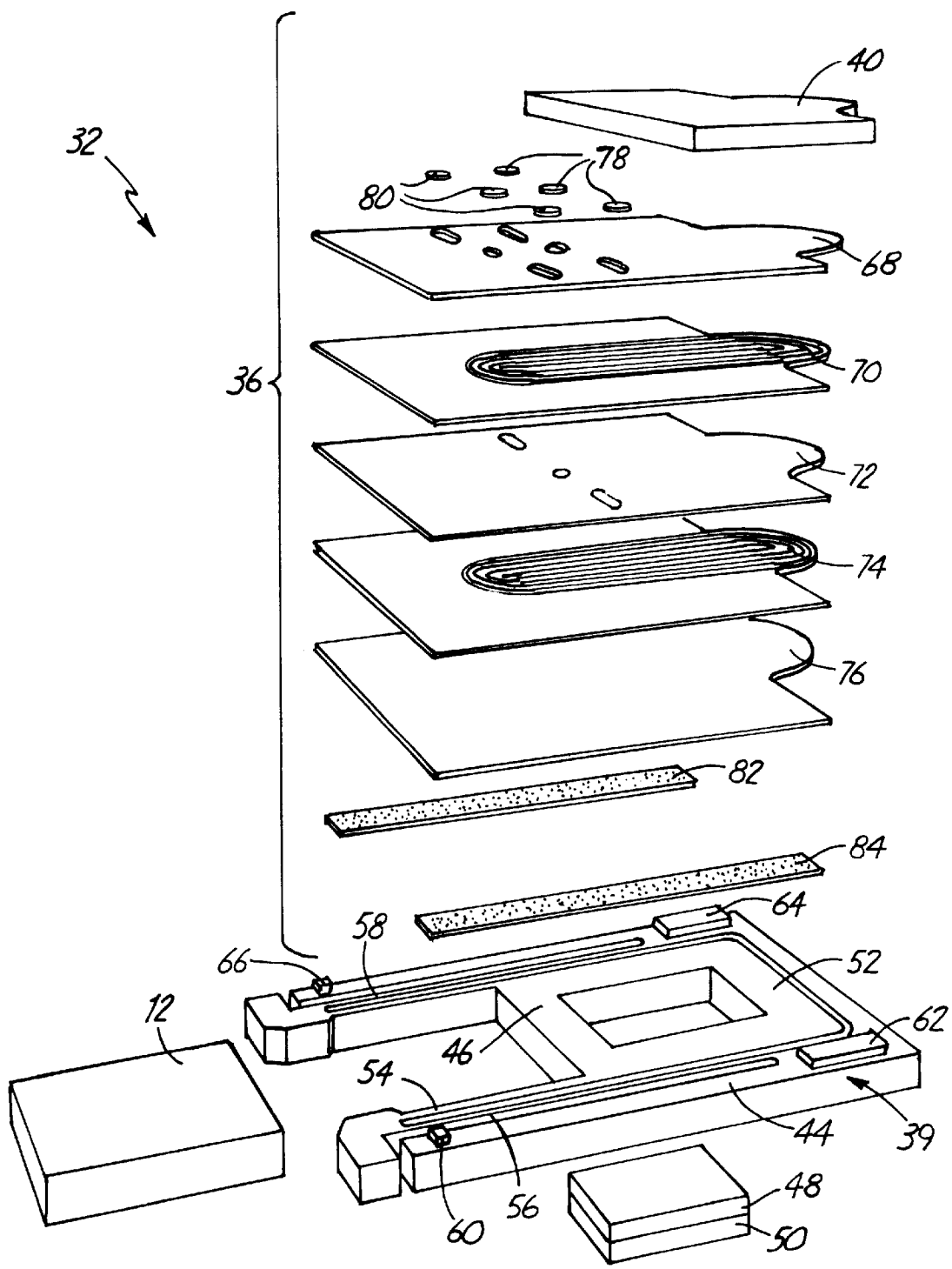
FIG. 6 is a further exploded perspective view of the microactuator and the coil-on-keeper assembly.

FIG. 6 is a further exploded perspective view of microactuator 32. Coil-on-keeper assembly 36 is preferably comprised of the following components: top keeper 40, a top insulator 68, a sense coil 70, a middle insulator 72, a drive coil 74, and a bottom insulator 76. The components of top keeper 40, top insulator 68, sense coil 70, middle insulator 72, drive coil 74, and bottom insulator 76 are integrated into a single component to form coil-on-keeper assembly 36. Solder pads 78 and 80 are connected to sense coil 70 and drive coil 74 respectively to provide electrical contacts with the coils. Sense coil 70 serves as a velocity sensing coil to detect changes in the magnetic field emanating from magnet 48 which moves with the rotor. A current is driven through drive coil 74 to produce the magnetic field needed to actuate microactuator 32. Coil-on-keeper assembly 36 is attached to microactuator frame 39 such that a magnetic circuit is formed between drive coil 74 and magnet 48. For example, at least two adhesive pads 82 and 84 could be attached to bottom insulator layer 76 and used to bond coil-on-keeper assembly 36 to stand-offs 60, 62, 64, and 66 of microactuator frame 39. Top keeper 40 in conjunction with bottom keeper 50 closes the magnetic circuit used to actuate microactuator 32 and shields the rest of the disc drive from any stray magnetic field generated by the magnetic circuit. Alternatively, coil-on-keeper assembly 36 may be comprised of a single drive coil and two insulator layers. Coil-on-keeper assembly would be comprised of top keeper 40, top insulator 68, drive coil 74 and bottom insulator 76. Drive coil 74 produces the magnetic field to actuate microactuator 32 and there is no sense coil to detect changes in the magnetic field in this embodiment.

Figure 7:
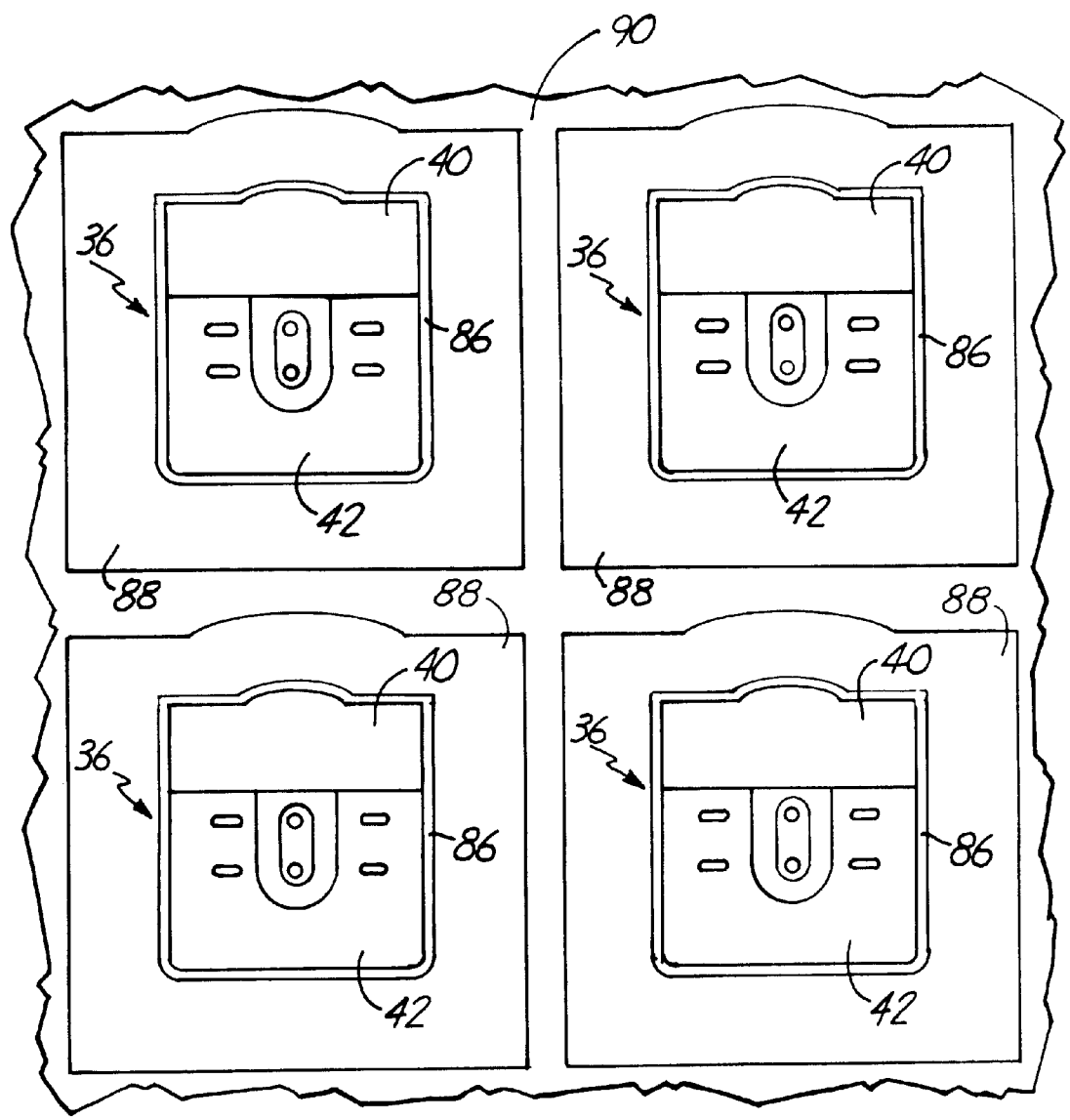
FIG. 7 is a top view of multiple coil-on-keeper assemblies formed on a keeper substrate.

During fabrication of coil-on-keeper assembly 36, thousands of coil-on-keeper assemblies may be formed on a single keeper substrate. FIG. 7 is a top view of multiple coil-on-keeper assemblies 36 formed on keeper substrate 90. After coil-on-keeper assemblies 36 are formed on keeper substrate 90, a sacrificial support membrane 86 is formed around each individual coil-on-keeper assembly 36. An etching process is then used to form the shape of top keeper 40 for each coil-on-keeper assembly 36. Sacrificial support membrane 86 holds each coil-on-keeper assembly 36 in place within a membrane 88. Membrane 88 is composed of the insulator layers (top insulator 68, middle insulator 72 and bottom insulator 76) as they are formed on keeper substrate 90. Sacrificial support membrane 86 keeps individual coil-on-keeper assemblies 36 connected to membrane 88 and prevents individual coil-on-keeper assemblies 36 from releasing during etching of top keeper 40.

FIGS. 8–17 are sectional views of a single coil-on-keeper assembly 36 taken along line A—A of FIG. 3 showing various stages of the fabrication process for forming coil-on-keeper assembly 36. Forming the structural features for coil-on-keeper assembly 36 requires multiple steps of patterning insulator layers and etching coil layers. Multiple coil-on-keeper assemblies 36 are formed on a keeper substrate 90 such that membrane 88 is formed with rows and columns of coil-on-keeper assemblies (as seen in FIG. 7). Such construction allows coil-on-keeper assembly 36 to be formed at the membrane level in bulk, thereby resulting in lower costs and the ability to form the separate components into a single integrated coil-on-keeper assembly. For simplicity, FIGS. 8–17 show a single coil-on-keeper assembly.

As shown in FIG. 8, keeper substrate 90 is formed to provide a base for fabricating coil-on-keeper assembly 36. Keeper substrate 90 is comprised of a magnetic keeper material. Preferably keeper substrate 90 is metal, either stainless steel or cobalt iron, such that in use top keeper 40 prevents any stray magnetic fields created by the magnetic circuit from disrupting the disc drive. Next top insulator 68 is patterned on top of keeper substrate 90 with electrical vias 92 and singulation vias 94 patterned into top insulator 68.

Top insulator 68 is preferably a photo imageable epoxy. Top insulator 68 is electrically insulating and mechanically strong.

There are six electrical vias 92 shown in FIG. 8, although fewer or more electrical vias 92 maybe used in fabricating each coil-on-keeper assembly 36. There is at least one singulation via 94 for each coil-on-keeper assembly 36 used for defining the outer edges of the assembly region for a single coil-on-keeper assembly 36. Singulation vias 94 define the perimeter of each assembly. Electrical vias 92 and singulation vias 94 extend through top insulator 68 and contact keeper substrate 90 such that vias 92 and 94 are exposed after etching top keeper 40.

A seedlayer 96 is deposited, by a method such as sputtering, on top of top insulator 68 after top insulator 68 is patterned. Seedlayer 96 is preferably chromium copper and electrically conductive. Seedlayer 96 forms a conductive film over top insulator 68 and within vias 92 and 94.

As shown in FIG. 9, a photoresist mold 98 for sense coil 70 is patterned on top of seedlayer 96. Photoresist mold 98 is used to pattern sense coil 70. Photoresist mold 98 exposes the portions of seedlayer 96 where sense coil 70 is to be plated and covers up the rest of seedlayer 96.

As shown in FIG. 10, sense coil 70 is plated and grows in the exposed portions of photoresist mold 98. After photoresist mold 98 is patterned on top of seedlayer 96, membrane 88 is electroplated. An electrical current is passed through membrane 88 causing the exposed seedlayer 96 to plate up through photoresist mold 98. Membrane 88 can be electroplated because seedlayer 96 is continuous over the entire membrane. As membrane 88 is electroplated, the exposed portions of seedlayer 96 permit a deposition of copper in photoresist mold 98. The deposited copper fills up mold 98 and forms sense coil 70.

After sense coil 70 is plated, photoresist mold 98 and excess seedlayer 96 are removed. FIG. 11 shows coil-on-keeper assembly 36 after removal of photoresist mold 98 and seedlayer 96. Photoresist mold 98 is chemically stripped away and top insulator 68 (made of epoxy) remains. Photoresist mold 98 is not heavily cured, and top insulator 68 is very difficult to strip away. Thus the chemical used to strip away photoresist mold 98 does not strip away top insulator 68. After stripping away photoresist mold 98, seedlayer 96 still remains on top of top insulator 68 where seedlayer 96 was not plated to form sense coil 70. The excess seedlayer is etched away everywhere on membrane 88, except where the copper sense coil 70 is formed. The excess seedlayer is etched away to prevent electrical short circuits of sense coil 70.

As shown in FIG. 12, middle insulator 72 is patterned on top of top insulator 68 and sense coil 70. Middle insulator 72 encapsulates sense coil 70 to prevent sense coil 70 from shorting out additional coils in coil-on-keeper assembly 36. Middle insulator 72 is preferably made of a photo imageable epoxy. Electrical vias 92 and singulation vias 94 are patterned into middle insulator 72. There is at least one singulation via 94 defining each coil-on-keeper assembly 36 and a plurality of electrical vias 92 which are used to house drive coil 74. Electrical vias 92 and singulation vias 94 extend through middle insulator 72 and top insulator 68 to contact keeper substrate 90 such that when keeper substrate 90 is etched away to form top keeper 40, electrical vias 92 and singulation vias 94 are exposed.

A seedlayer 100 is deposited, by a method such as sputtering, on top of middle insulator 72 after middle insulator 72 is patterned. Seedlayer 100 continuously covers membrane 88, and more specifically middle insulator 72, electrical vias 92 and singulation vias 94. Seedlayer 100 is preferably chromium copper and electrically conductive. Seedlayer 100 forms a continuous film over middle insulator 72 and within electrical vias 92 and singulation vias 94.

As shown in FIG. 13, a photoresist mold 102 for drive coil 74 is patterned on top of seedlayer 100. Photoresist mold 102 is used to pattern drive coil 74. Photoresist mold 102 exposes the portions of seedlayer 100 where drive coil 74 is to be plated and covers up the rest of seedlayer 100. Membrane 88 is electroplated to form drive coil 74. An electrical current is passed through membrane 88 causing the exposed seedlayer 100 to plate up through photoresist mold 102. The entire membrane 88 can be electroplated because seedlayer 100 forms a continuous layer over the entire membrane. As membrane 88 is electroplated, the exposed portions of seedlayer 100 permit a deposition of copper in photoresist mold 102 that fills up mold 102 and forms drive coil 74.

Figure 14:
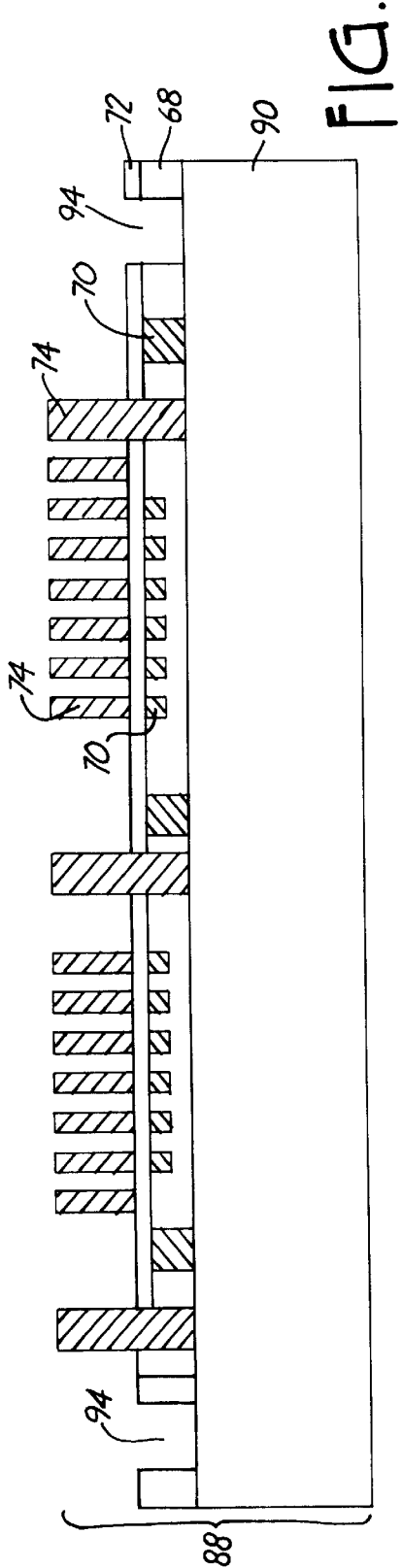

After drive coil 74 is plated, photoresist mold 102 and excess seedlayer 100 are removed. FIG. 14 shows coil-on-keeper assembly 36 after removal of photoresist mold 102 and seedlayer 100. Photoresist mold 102 is chemically stripped away, but middle insulator 72 made of epoxy remains. Photoresist mold 102 is not heavily cured, and middle insulator 72 is very difficult to strip away, thus the chemical used to strip away photoresist mold 102 does not strip away middle insulator 72. After stripping away photoresist mold 102, seedlayer 100 still remains where seedlayer 100 was not plated to form drive coil 74. The excess seedlayer is etched away everywhere on membrane 88, except where the copper drive coil 74 is formed. The excess seedlayer is etched away to prevent electrical shorts of drive coil 74.

Figure 15:
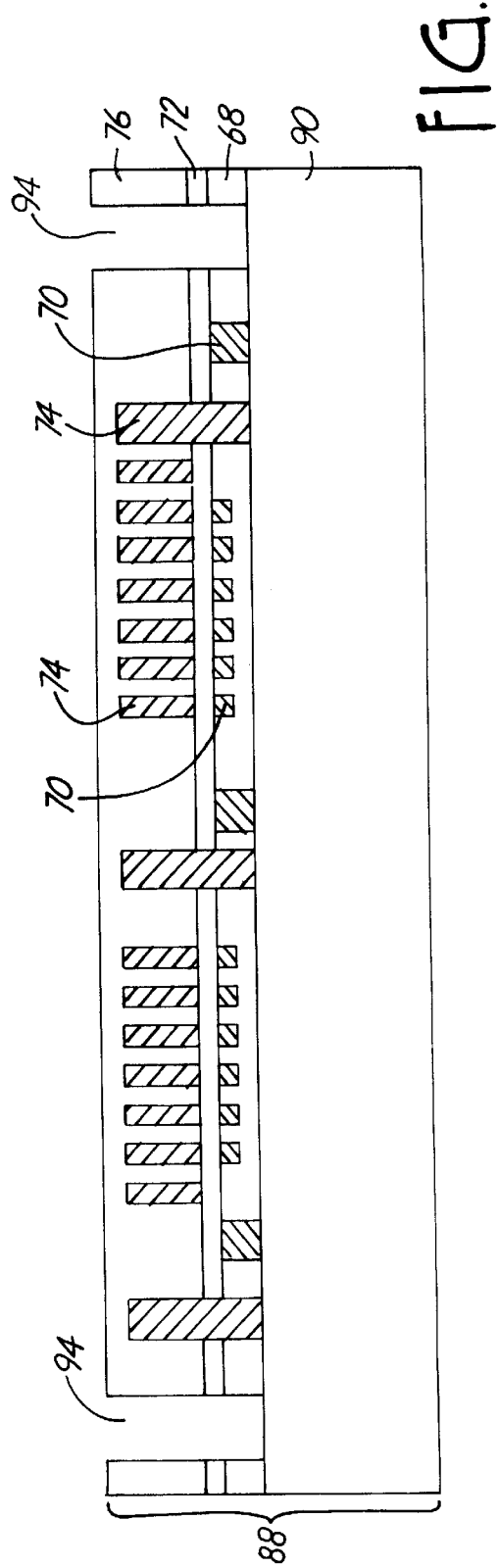

As shown in FIG. 15, bottom insulator 76 is formed on top of middle insulator 72 and drive coil 74. Bottom insulator 76 encapsulates drive coil 74 to prevent drive coil 74 from shorting out. Bottom insulator 76 is preferably made of a photo imageable epoxy. Singulation vias 94 are patterned into bottom insulator 76. There is at least one singulation via 94 defining each coil-on-keeper assembly 36. Singulation vias 94 extend through bottom insulator 76, middle insulator 72 and top insulator 68 to contact keeper substrate 90, such that when keeper substrate 90 is etched to form top keeper 40, singulation vias 94 are exposed.

Figure 16:
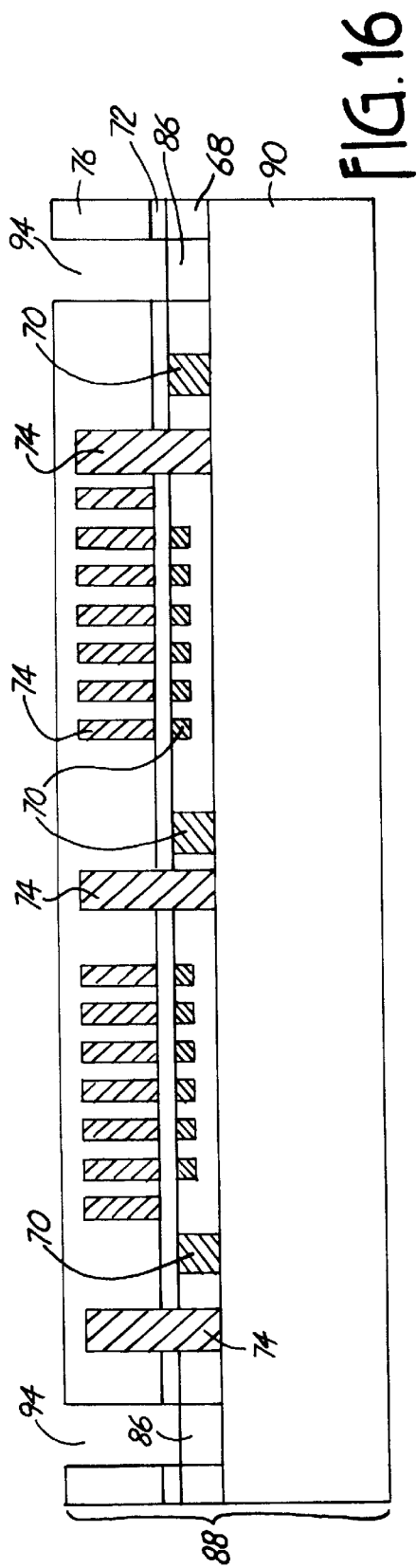

As shown in FIG. 16, sacrificial support membrane 86 is formed in singulation vias 94. Throughout the fabrication of coil-on-keeper assembly 36, singulation vias 94 are kept open such that all the assemblies are not permanently connected together and each coil-on-keeper assembly can be singulated out of membrane 88. Sacrificial support membrane 86 surrounds each coil-on-keeper assembly 36 formed on keeper substrate 90. Sacrificial support membrane 86 keeps all the assemblies connected together on membrane 88. Coil-on-keeper assemblies 36 stay connected together during the etching of top keeper 40 so that one coil-on-keeper assembly 36 cannot be separated from the membrane. Sacrificial support membrane 86 acts as a dummy layer. Sacrificial support membrane 86 is mechanically strong enough to hold coil-on-keeper assembly 36 in membrane 88 but is easily etched out with a plasma or a chemical. Alternatively, a different temporary support, such as a thermal release film, may be used rather than sacrificial support membrane 86. The thermal release film is layered between keeper substrate 90 and top insulator 68. However, other temporary supports may be used as known to those skilled in the art.

Figure 17:
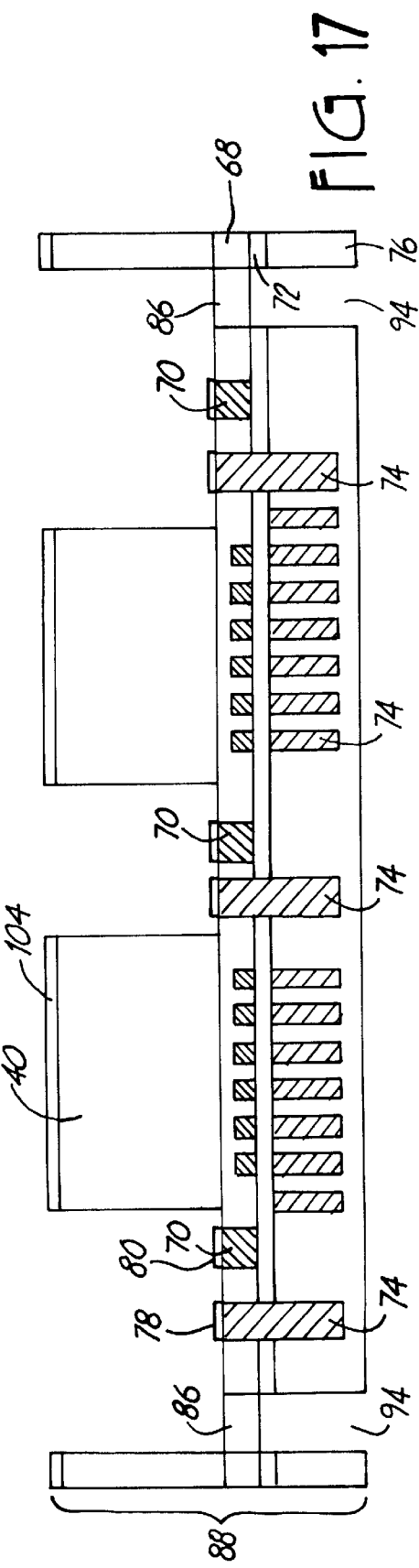

FIG. 17 shows coil-on-keeper assembly 36 after etching top keeper 40. Coil-on-keeper assembly 36 is inverted to etch substrate 90 and form top keeper 40, with keeper substrate 90 facing upward and bottom insulator 76 facing downward. A pattern 104 is formed on the bottom of keeper substrate 90. Pattern 104 is used to etch top keeper 40 for each coil-on-keeper assembly 36. Either a wet or dry etching technique is used. Sacrificial support membrane 86 keeps all the coil-on-keeper assemblies formed on membrane 88 in place after etching substrate 90 to form top keeper 40. Each coil-on-keeper assembly 36 on membrane 88 has a separate top keeper 40.

After keeper substrate 90 is etched to form top keeper 40, sense coil 70 and drive coil 74 are exposed through top insulator 68 and electrical vias 92. Preferably, solder pads 78 are attached to the exposed drive coil 74. Solder pads 78 and 80 provide electrical contacts with sense coil 70 and drive coil 74. Alternatively, electrical contact material (such as tantalum and gold or conductive epoxy) is layered between keeper substrate 90 and top insulator 68. After keeper substrate 90 is etched to form top keeper 40, a thin layer of electrical contact material covers sense coil 70 and drive coil 74. Solder pads 78 and 80 are attached to the material to provide electrical contacts with sense coil 70 and drive coil 74.

Figure 18:
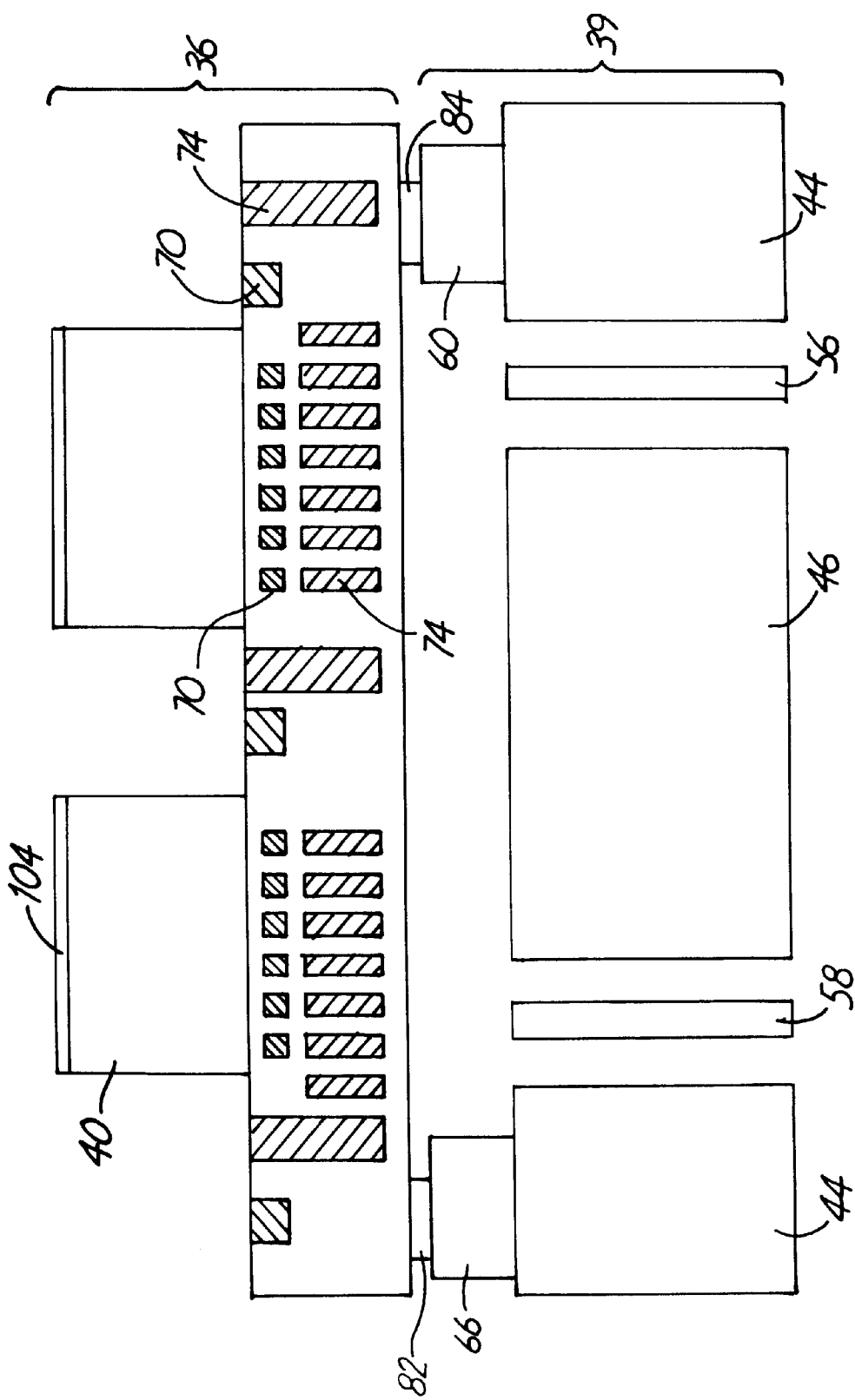
FIG. 18 is a sectional view of the microactuator and coil-on-keeper assembly taken along line A—A of FIG. 3.

In FIG. 18 sacrificial support membrane 86 is removed from singulation vias 94 and coil-on-keeper assembly 36 is bonded to microactuator frame 39. Sacrificial support membrane 86 is preferably removed by dry etching with a plasma, however, alternatively sacrificial support membrane 86 can be removed through wet etching or mechanical breakage. Once sacrificial support membrane 86 is removed each coil-on-keeper assembly 36 is singulated from membrane 88 such that individual integrated coil-on-keeper assemblies 36 are formed. Alternatively, coil-on-keeper assembly 36 could be held in place during keeper etch by placing the assembly on a thermal release film or a UV release film prior to keeper etch, thereby eliminating the need for a sacrificial support membrane.

Each coil-on-keeper assembly 36 is bonded to a separate microactuator frame 39. Adhesive pads 82 and 84 are attached to bottom insulator 74 along or near the outer edges of coil-on-keeper assembly 36. Adhesive pads 82 and 84 attached to coil-on-keeper assembly 36 are then bonded to stand-offs 60,62, 64, and 66 (only 60 and 66 are shown in FIG. 18) such that drive coil 74 forms a magnetic circuit with magnet 48 carried by microactuator 32. Alternatively, adhesive pads 82 and 84 are attached to stand-offs 60, 62, 64 and 66 or the standoffs are patterned on the coil-on-keeper assembly. Coil-on-keeper assembly 36 is suspended above magnet 48 carried by rotor 46 of microactuator 32 by a space defined by stand-offs 60, 62, 64, and 66.

The ability to fabricate an integrated coil-on-keeper assembly decreases the cost and difficulty associated with assembling the separate components into an assembly. The components typically included in a coil-on-keeper assembly are a conductive drive coil, a conductive sense coil, insulator layers and keeper layers to contain stray magnetic fields. Previously, these separate components were separably manufactured and then assembled into a single coil-on-keeper assembly. The present invention is a method that integrates the components (drive coil, sense coil, and insulator layers) upon a keeper substrate and forms the coil-on-keeper assemblies in a single process. Additionally, the coil-on-keeper assemblies can be manufactured at the wafer-level and in bulk, thus decreasing assembly costs and increasing manufacturing efficiency.

The present invention fabrication method simplifies the assembly process of the components of a microactuator. It allows for separate fabrication of the micromachined rotor/stator portion and separate fabrication of the integrated coil-on-keeper assembly. The coil-on-keeper assembly is then bonded to the rotor/stator portion to form the microactuator.

Although the present invention has been described with reference to preferred embodiments, workers skilled in the art will recognize that changes may be made in form and detail without departing from the spirit and scope of the invention. For example, the coil layers do not necessarily need to have a coil shape and a conductive layer in other shapes or electrodes may be used. Conductive layers can be formed using alternative methods such as metallo-organic chemical vapor deposition (MOCVD) with chemical mechanical planarization (CMP), more particularly with a damascene CMP process. Fewer or additional conductive layers may be fabricated for the coil-on-keeper assembly. Furthermore, other supports may be used for holding each coil-on-keeper assembly within the membrane, such as thermal release films or UV release films.

What is claimed is:

1. A microactuator comprising:
   a stator;
   a rotor operatively connected to the stator such that the rotor is movable with respect to the stator in a first horizontal plane generally parallel to a surface of a disc; and
   a coil-on-keeper assembly having a keeper substrate and a coil fabricated as an integrated assembly, the coil-on-keeper assembly bonded to the stator.

2. The microactuator of claim 1 wherein the coil-on-keeper assembly comprises a top keeper, at least one coil layer and at least two insulator layers vertically arranged in a plurality of planes generally parallel to the first horizontal plane, the coil layer and the insulator layers being formed and patterned upon the top keeper.

3. The microactuator of claim 2 wherein the coil-on-keeper assembly comprises the top keeper, a top insulator, a drive coil, a middle insulator, a sense coil and a bottom insulator.

4. The microactuator of claim 2 wherein the magnetic circuit comprises the coil-on-keeper assembly and at least one magnet disposed in the rotor, the magnets being operable in response to a current applied to the coil layer to cause movement of the rotor with respect to the stator in the first horizontal plane.

5. A coil-on-keeper assembly fabricated as an integrated assembly, the coil-on-keeper assembly comprising:
   a keeper substrate which is patterned and etched to form a top keeper;
   a top insulator layer formed upon the top keeper, the top insulator layer including a plurality of vias;
   a first coil layer formed on the top keeper within the vias of the top insulator layer and the top insulator layer; and
   a bottom insulator layer formed on the first coil layer and the top insulator layer.

6. The coil-on-keeper assembly of claim 5 wherein the first coil layer is a drive coil.

7. The coil-on-keeper assembly of claim 5, and further comprising:
   a middle insulator layer formed upon the first coil layer, the middle insulator layer including a portion of the plurality of vias; and
   a second coil layer formed upon the middle insulator layer wherein the bottom insulator is positioned upon the second coil layer.

8. The coil-on-keeper assembly of claim 7 wherein the first coil layer is a sense coil and the second coil layer is a drive coil.

9. The coil-on-keeper assembly of claim 5 wherein a portion of the first coil layer is in contact with the top keeper.

10. The coil-on-keeper assembly of claim 9, and further comprising electrical contacts to the portion of the first coil layer in contact with the top keeper.

11. The coil-on-keeper assembly of claim 10 wherein the electrical contacts comprise solder pads.

12. The coil-on-keeper assembly of claim 10 wherein the electrical contacts comprise a gold layer between the top keeper and the top insulator layer.

13. The coil-on-keeper assembly of claim 5, and further comprising an adhesive pad disposed on the bottom insulator to bond the coil-on-keeper assembly to the stator.

14. The coil-on-keeper assembly of claim 5 wherein the coil layers and the insulator layers are formed and patterned upon the keeper substrate.

15. A coil-on-keeper assembly fabricated as vertically arranged integrated assembly, the coil-on-keeper assembly comprising:

a keeper substrate which is patterned and etched to form a top keeper;

a top insulator layer formed upon the top keeper, the top insulator layer including a plurality of vias;

a first coil layer formed on the top keeper within the vias of the top insulator layer and the top insulator layer;

a middle insulator layer formed upon the first coil layer, the middle insulator layer including a portion of the plurality of vias; and a second coil layer formed upon the middle insulator layer and the top keeper within the portion of vias of the middle insulator layer; and a bottom insulator layer formed on the second coil layer.

16. The coil-on-keeper assembly of claim 15 wherein the coil layers and the insulator layers are formed and patterned upon the keeper substrate.

17. The coil-on-keeper assembly of claim 15, and further comprising electrical contacts to a portion of the first coil layer in contact with the top keeper.

18. The coil-on-keeper assembly of claim 15, and further comprising electrical contacts to a portion of the second coil layer in contact with the top keeper.

* * * * *